May 8, 1962      O. B. SHERMAN      3,032,823

METHOD OF FORMING PLASTIC ARTICLES

Filed May 26, 1960      5 Sheets-Sheet 1

INVENTOR.
ORVILLE B. SHERMAN

BY
*Mead, Browne, Schuyler & Beveridge*
ATTORNEYS

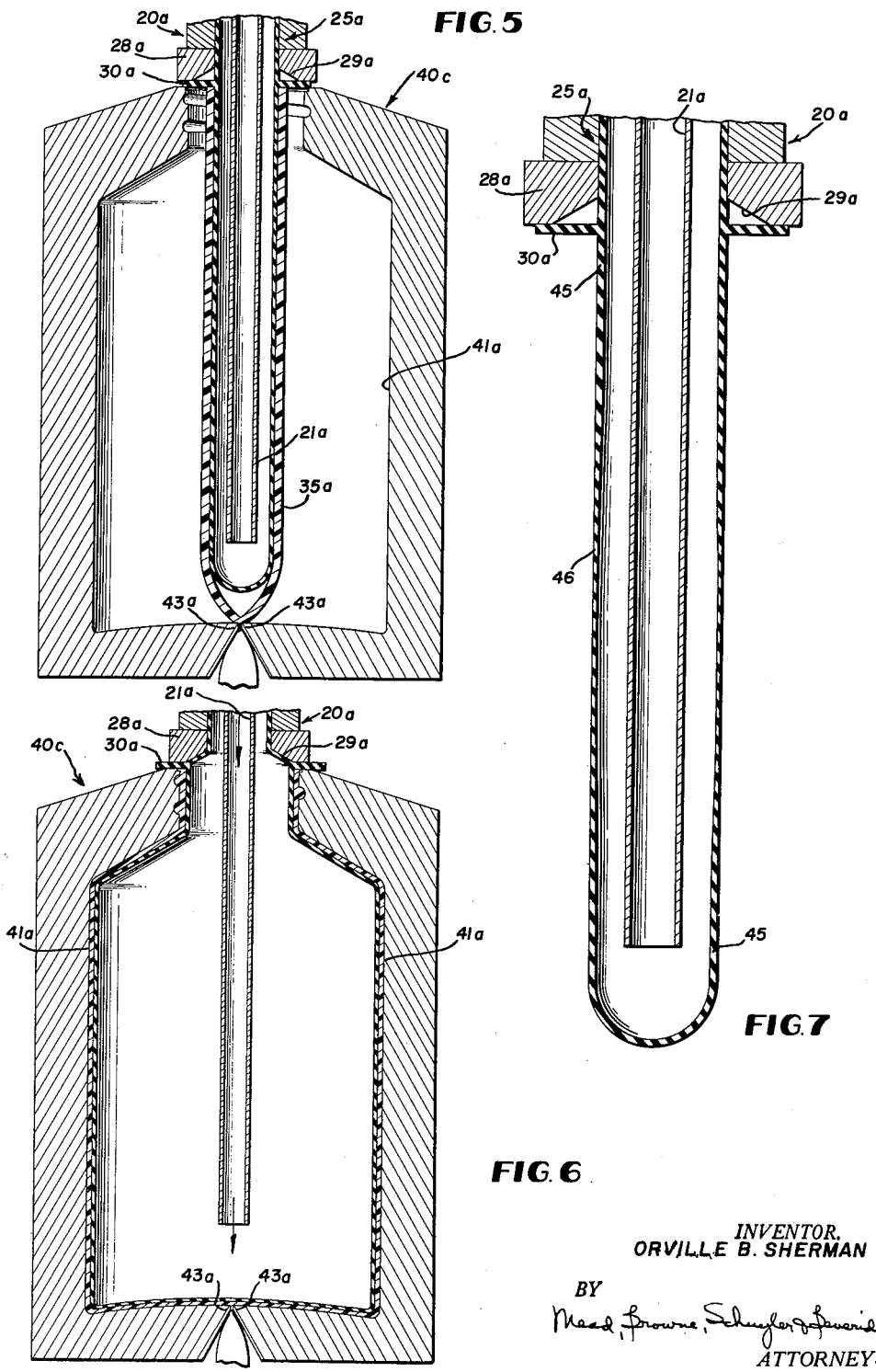

May 8, 1962  O. B. SHERMAN  3,032,823
METHOD OF FORMING PLASTIC ARTICLES
Filed May 26, 1960  5 Sheets-Sheet 3
FIG. 8
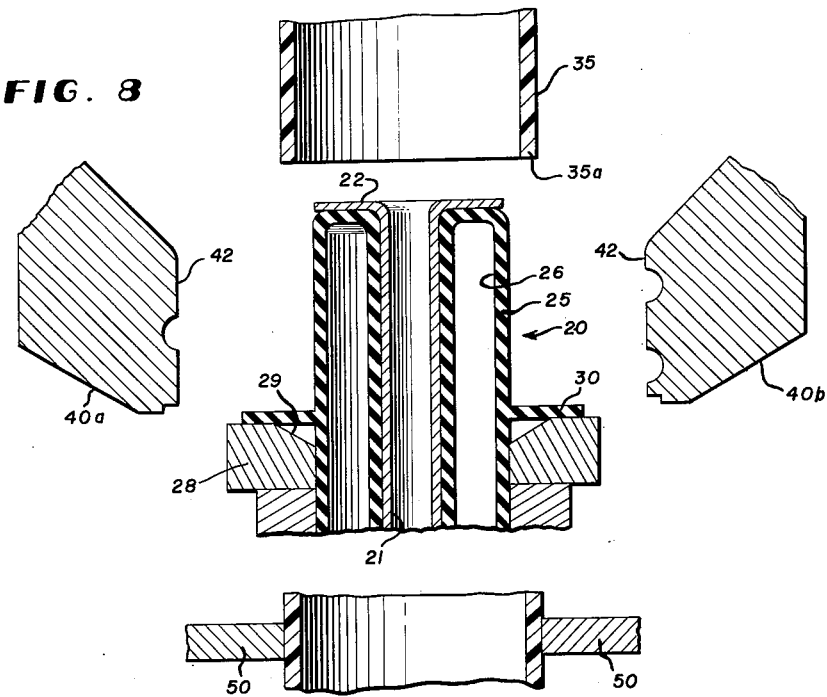
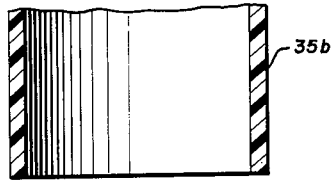
FIG. 9
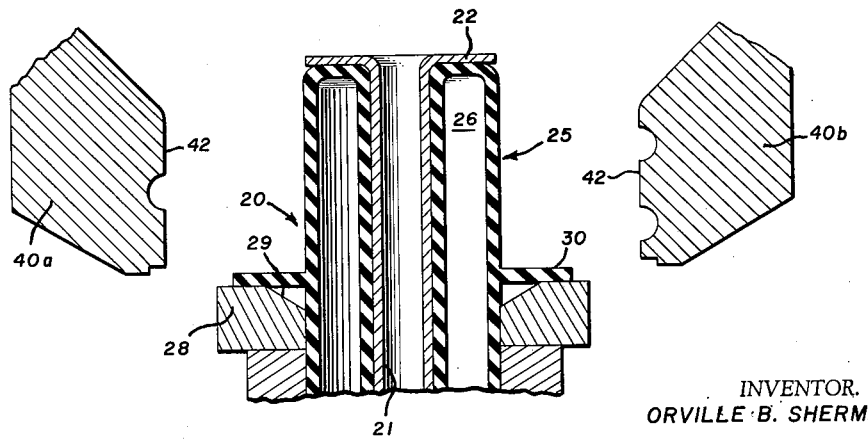
INVENTOR.
ORVILLE B. SHERMAN
BY
ATTORNEYS

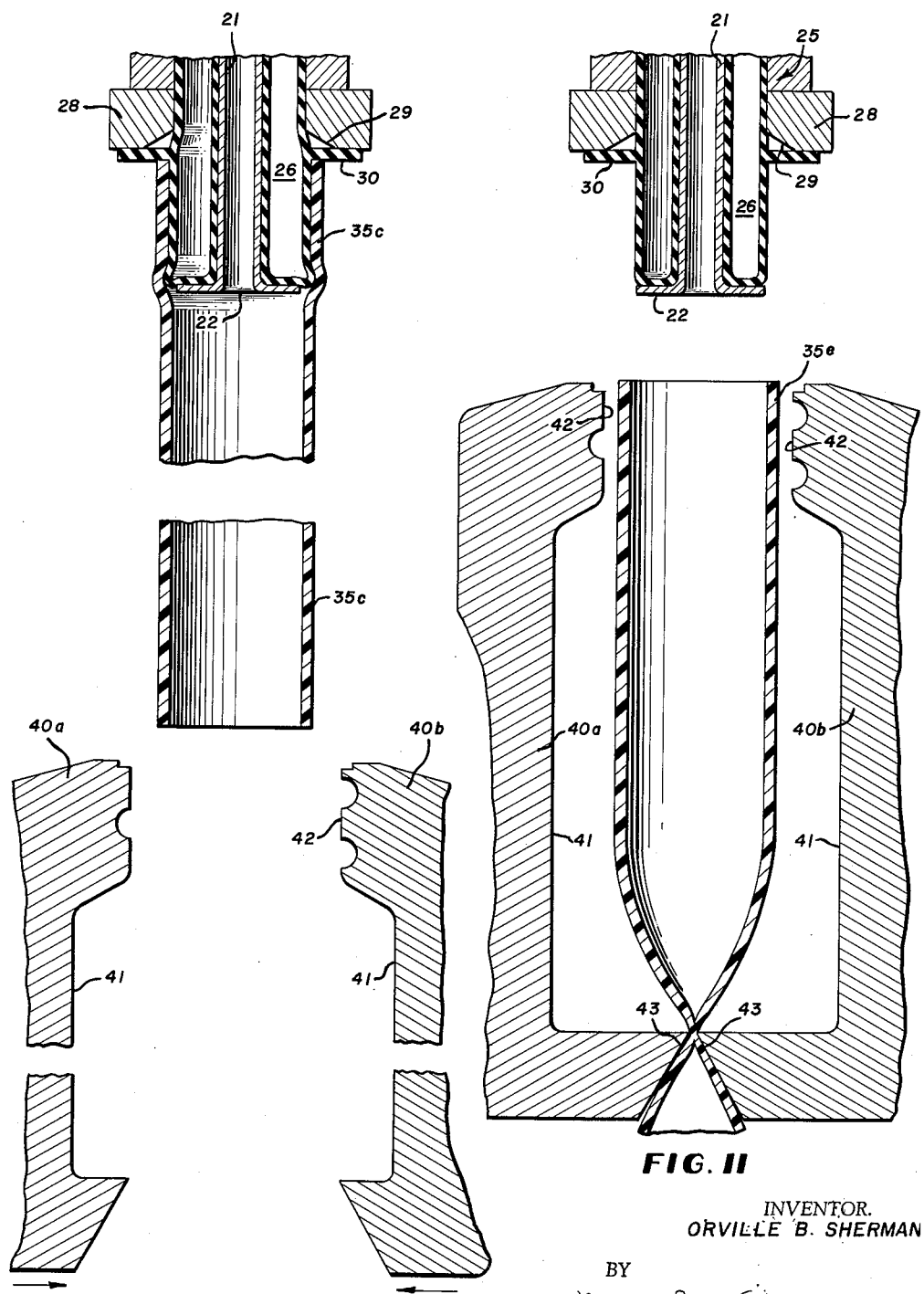

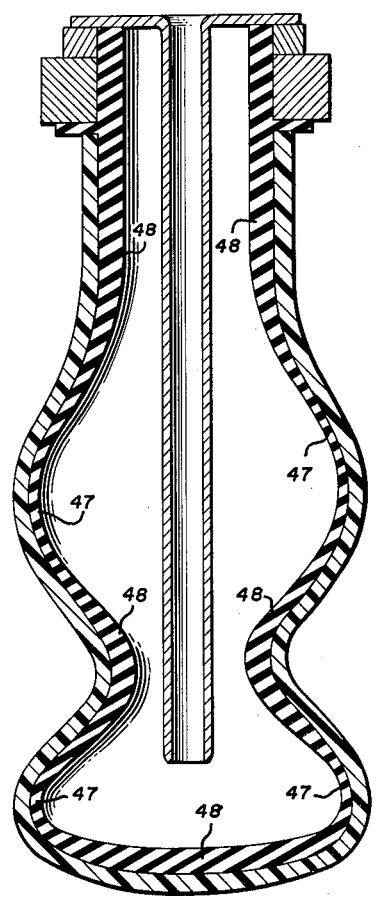

United States Patent Office

3,032,823
Patented May 8, 1962

3,032,823
METHOD OF FORMING PLASTIC ARTICLES
Orville B. Sherman, West Orange, N.J., assignor to Sherman Plastics Corporation, a corporation of Ohio
Filed May 26, 1960, Ser. No. 31,860
20 Claims. (Cl. 18—55)

The present invention relates to a method of making a plastic article and more particularly to a process for forming at least a portion of a blown plastic article by a semi-injection molding process between a rigid mold surface and a fluid pressure actuated mold surface.

In the manufacture of blown plastic articles, such as containers, bottles, toys and the like, the simplest process involves the extrusion of a tube, the enclosure of the extruded tube between the sections of a partible blow mold, and the inflation of the tube against the mold walls. Such a process is illustrated in the patent to Burch No. 2,898,633. The enclosure of the tube in the mold, followed by merely inflating the tube, necessarily results in the formation of waste portions requiring subsequent severance from the blown article. Additionally, the interior of the article is formed only by the expansion of the blowing medium.

To avoid the formation of such waste portions and to form articles having interior or other portions which must be made with accuracy, such as the neck of a bottle, the process of my earlier patent, No. 2,804,654 has been utilized.

This process involves the injection molding of a finished article portion, the later extrusion of the tube integral with the finished portion, and the subsequent blowing of the tube to form the remainder of the article.

The present invention provides a different process combining the best features of both processes above defined. More particularly, the process of the present invention forms the complete article within the blow mold, but eliminates any waste portions by the utilization of a "semi-injection" step wherein a portion of the article is formed between the rigid exterior blow mold and an interior fluid pressure actuated surface. Since the article portion is formed between two mold surfaces, greater interior accuracy and better wall thickness control is obtained.

More specifically, one method of the present invention contemplates the extrusion of a tube from an extrusion orifice onto an inflatable inner mold surface initially positioned at the orifice and movable away from the orifice, so that the initially extruded portions of the tube circumferentially surround the inflatable mold surface or "core." Alternatively, the deflated core can be inserted into the tube during or after extrusion. Preferably, the core forms a supporting surface for less than the complete tube, and the core, when deflated, is of such size that it and the enclosing tube are surrounded by the blow mold upon blow-mold closure. After the blow-mold sections are closed, the core is inflated or otherwise actuated by fluid pressure so as to expand that portion of the tube surrounding the core into contact with the adjacent blow mold surfaces, thereby confining the expanded tube portion between the blow-mold and the core. Thus, the tube portion surrounding the core is chilled to its finally set configuration while confined between the inflated core and the blow mold. Subsequently, or even simultaneously, the remainder of the tube can be expanded interiorly of the blow-mold, or, alternatively, an elongated core can be utilized so that inflation of the core will inflate and set the entire article.

Thus, the present invention provides a so-called "semi-injection" molding process for forming at least a part of an article between a surrounding blow-mold and an interior core actuated by fluid pressure. It is not necessary that the core be inflated by pneumatic pressure. The pressure may be hydraulic with various heat exchange liquids utilized as the hydraulic fluid to both expand all or a part of the tube and to extract heat from the interior of the tube during and after blowing. Further, the core may be of varying wall thickness to differentially expand different portions of the core upon inflation or the surrounding plastic tube may be of variant thickness to provide control of the wall thickness within the completed article.

It is, therefore, an important object of the present invention to provide a method and means for making a plastic article wherein at least a portion of the article is formed between a rigid mold surface and a fluid pressure actuated mold surface.

Another important object of this invention is the provision of a method of making a plastic article from an extruded tube at least a portion of which surrounds an expansible core, the core being expansible by fluid pressure to confine the tube portion between the core and a surrounding rigid mold surface.

Still another object is to provide a method of making an article from an extruded plastic tube by transferring and blowing the tube by means of an expansible core disposed therein.

It is a further object of this invention to provide an improved method for making a plastic article whereby a tube is extruded through an orifice, at least a portion of the extruded tube circumscribing an expansible core, the tube being subsequently enclosed within a rigid blow-mold and the core being expanded to confine those tubing portions surrounding the core between the core and the rigid mold.

An additional object of this invention is the provision of an improved method of making a plastic article by a blowing process wherein a tubular formation of heated thermoplastic material is expanded to the desired configuration by the inflation of an inflatable core disposed interiorly of the tubular formation, the core being constructed to produce the desired configuration of the finished plastic article by inflation to a predetermined degree.

Yet another object of this invention is the provision of an improved method of making a plastic article one portion of which is formed by the free expansion of an extruded tube and other portion of which is formed by expanding the tube into contact with a surrounding mold surface by the inflation of an inflatable core disposed interiorly of the tube, thereby confining the other portion of the tube between cooperating mold and core surfaces.

Other and further objects of this invention will become apparent from the following description.

On the drawings:

FIGURE 5 is a view similar to FIGURE 4 illustrating a modified form of the apparatus prior to inflation of the core;

FIGURE 6 is a view similar to FIGURE 5 illustrating a final step in the method;

FIGURE 7 is a view of a modified form of core having an expansible wall of differential thickness for varying the rate and amount of inflation of the core;

FIGURE 8 is a fragmentary, sectional, somewhat schematic view illustrating a modified method of producing a hollow plastic article in accordance with this invention wherein the plastic tube is extruded over an inflatable core that is axially spaced from the extruder orifice;

FIGURE 9 is a fragmentary, sectional, somewhat schematic view illustrating another modified method of producing a hollow plastic article in accordance with this invention wherein a severed length of heated plastic tubing is transferred to a molding position at which the inflatable core is inserted into one end of the tubing;

FIGURE 10 is a fragmentary, sectional, somewhat schematic view illustrating an additional modified method of producing a hollow plastic article in accordance with this invention wherein a severed length of heated plastic tubing is transferred to a molding position by insertion and partial inflation of the inflatable core prior to blowing of the tube;

FIGURE 11 is a fragmentary, sectional, somewhat schematic view illustrating yet another modified method of producing a hollow plastic article in accordance with this invention wherein a length of heated plastic tubing is enclosed within a mold, and the inflatable core is then inserted into one end of such tubing; and FIGURE 12 is a fragmentary, sectional, somewhat schematic view illustrating a modified method of producing a hollow plastic article in accordance with this invention, illustrating a method of producing a hollow plastic article solely by inflation of an inflatable core and without the benefit of external molds.

Figure 1:
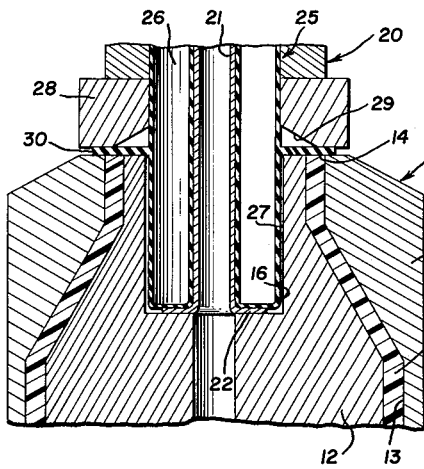
FIGURE 1 is a fragmentary, sectional somewhat schematic view of an apparatus of the present invention adapted to carry out the method of the present invention, the apparatus being illustrated in its initial or starting position.

As shown on the drawings:

In FIGURE 1, reference numeral 10 refers generally to an extruder outlet comprising an outer orifice block 11 cooperating with a coaxial mandrel 12 to define therebetween a channel 13 terminating in an outlet orifice 14 for the issuance of plastic material 15. The plastic material may be supplied to the channel 13 in the orifice 14 from any suitable extruder, the plastic material 15 being plasticized and heated so as to be in a condition for expansion and setting to a predetermined shape and pressurized to flow out of orifice 14.

The orifice mandrel 12 is provided with a central, cylindrical recess 16 coaxial with the orifice 14 and adapted to receive therein an expansible core indicated generally at 20.

This core 20 comprises a central tubular conduit 21 terminating in a lower radial flange 22 and formed of rigid material, such as steel or the like. Telescoped onto the pipe 21 is an annular expansible core element 25, formed of inherently resilient material such as rubber or the like, the core element 25 being in the form of a closed bag supported by the pipe 21 and the out-turned flange 22 thereof. This bag 25 is freely expansible radially outwardly and encloses an interior annular inflation space 26 concentric with the pipe 21 and of such radial dimension as to be received by the recess 16 with radial clearance therebetween, as at 27.

The supporting pipe 21 is carried by a suitable actuating mechanism (not shown) for moving the pipe 21 and the bag or inflatable core element 25 axially of the orifice in alignment therewith and into and out of the recess 16.

As a part of such a retracting mechanism, an annular, radially extending support ring 28 is provided to enclose the upper portion of the bag 25, the ring being provided with a frusto-conical downwardly and outwardly tapering surface 29 for a purpose to be hereinafter more fully described. The bag 25 also carried a radially extending upper wall 30 formed integrally with the bag and projecting radially therefrom to an extent sufficient to cover the orifice 14 when the core is positioned in the recess 16 as indicated in FIGURE 1.

Figure 2:
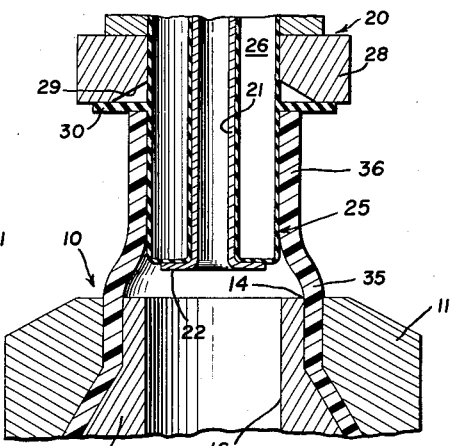
FIGURE 2 is a view similar to FIGURE 1 illustrating the apparatus carrying out a subsequent step of the method.

With the parts positioned as illustrated in FIGURE 1 of the drawings, it will be seen that the ring 28 supports the radial flange 30 of the bag 25 and urges the flange against the orifice 14 to shut off the flow of plastic through the orifice. Upon movement of the core 20 vertically to retract the lower end of the bag 25 from the recess 16, the position of FIGURE 2 will be rapidly attained. During the withdrawal of the core, plastic material 15 would be extruded through the orifice 14 and such material will flow onto and peripherally enclose the outer surface of the annular core or bag 25 as the core is retracted from its recess 16. Continued retraction of the core 20 upwardly away from the orifice will continue the extrusion, thus forming a tube 35 (FIGURES 2 and 3), the upper portion 36 of which peripherally encloses the expansible core member 25. The inherent radial contraction of the extruded tube will bring the tube portion 36 into closely embracing relation to the core 25.

Figure 4:
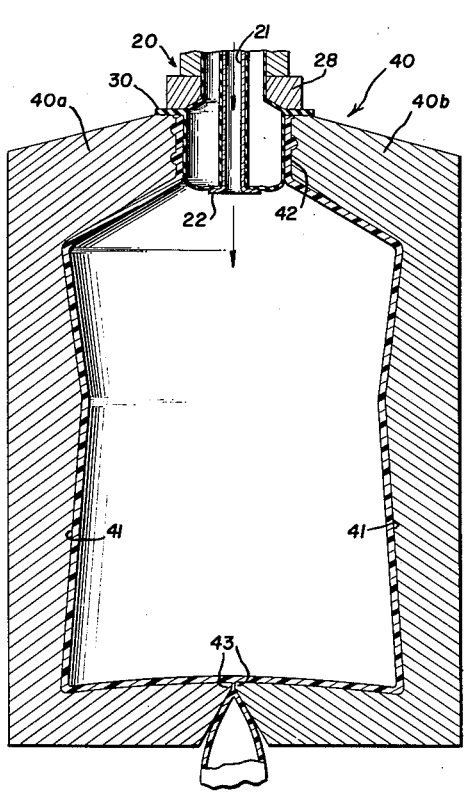
FIGURE 4 is a view similar to FIGURE 3 illustrating the final blowing step of the method.
Figure 3:
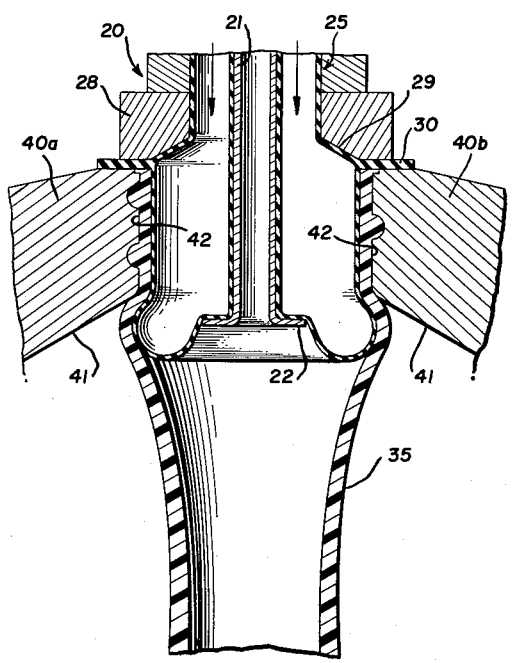
FIGURE 3 is a view similar to FIGURE 2 illustrating the expansion of the core within a surrounding blow-mold.

After a tube of the desired length has been extruded, the tube is enclosed within the separable sections 40a and 40b of a rigid blow-mold 40, as best shown in FIGURES 3 and 4. These mold sections 40a and 40b cooperatively define an interior cavity 41 having a contour of the desired finished article, which in the illustrated embodiment of the invention, is a container.

The uppermost portions of the cavity 41 define the finish or neck of the container, as at 42, the interior diameter of the finish-defining surfacse of 42 being substantially greater than the exterior diameter of the tube portion to surrounding the core 25. When the mold sections 40a and 40b are closed onto the tube 35, the tube portion 36 is positioned in radial alignment with the finish-defining surfaces 42 and the core flange 30 overlies the opening defined by the finish surfaces 42. Next, a fluid under pressure, either gaseous or liquid, is introduced into the hollow interior 26 of the core 25 to expand the bag radially outwardly with respect to the pipe 21. The frusto-conical under cut surface 29 at the bottom of the ring 28 accommodates and limits such expansion of the bag.

Necessarily, the portion 36 of the tube 35 surrounding the bag will be expanded radially therewith into contact with the finished surfaces 42. The expansion of the bag is also limited by the out-turned radial flange 22 at the end of the pipe 21, and it will be seen that the fluid under pressure introduced into the core 25 will urge the plastic portion 36 into snug engagement with the finish-surfaces 42. In fact, the plastic portion 36 is "semi-injection" molded by virtue of its being confined between the mold surfaces 42 and the expanded bag 25.

After expansion of the bag 25 as illustrated in FIGURE 3 of the drawings, the remainder of the tube 35, previously positioned interiorly of the closed mold halves 40a and 40b and pinched shut by lower cooperating surfaces 43 on the mold halves remote from the finished portions 42 thereof, is expanded by an expansion medium such as air, introduced through the pipe 21. The core 25 can be maintained inflated or even be deflated during expansion of the tube.

Thus, the tube is expanded as illustrated in FIGURE 4 into contact with the remainder of the mold cavity surfaces 41. Alternatively, the core 25 and the tube 35 can be simultaneously inflated.

To aid in the setting of the portion 36 of the plastic surrounding the bag 25, the fluid introduced into the bag may be a suitable heat exchange fluid such as cold water, a refrigerant ($CO_2$), or cooled, recirculating air. Inasmuch as the fluid medium filling the bag 25 never touches the plastic portion 36 but acts thereon only through the medium of the inflatable core, practically and desired fluid coolant medium which is not injurious to the resilient bag may be utilized.

In the modified embodiment of the drawings illustrated in FIGURES 5 and 6 of the drawings, the bag 25a is substantially elongated, the tube 21a is likewise elongated and merely depends into the bag. Similarly, the bag receiving recess 16 (FIGURE 1) on mandrel 13 is elongated to receive bag 25a. The bag 25 supports the extruded tube 35 throughout substantially its entire length and terminates in closely spaced relation above the tube-closing or pinching surfaces 43a of the mold 40c.

In this embodiment of the invention, fluid under pressure, either liquid or gaseous, is merely introduced axailly through the tube 21a, the bag being inflated, as best shown in FIGURE 6, to urge the tube radially outwardly against the interior mold surfaces 41a. Obviously, the utilization of a heat exchange fluid for inflating the entire bag offers an opportunity to more effectively chill the final blown plastic article.

Another modified form of the invention is illustrated in FIGURE 7 of the drawings wherein it will be noted that the wall thickness of the bag 25a varies axially of the length thereof. Reference numeral 45 indicates the nominal wall thickness of the bag 25, while reference numeral 46 indicates a thinner or reduced wall thickness.

Obviously, by varying the wall thickness of the bag 25a the expansion characteristics of the bag are correspondingly varied. The thinner wall thickness section 46 will expand more easily than the relatively thicker wall portion 45. Further, the plastic material carried by the thinner section 46 will contact the interior mold wall 41a first, and the greater expansion of the reduced wall thickness area 46 will result in thinner side walls for the container. The finish and shoulder portions formed by plastic expanded by expansion of the nominal thickness material 45 will be of greater wall thickness, as will be the bottom contacted by the material engaged by the bottom portion of the bag 25a which also is of nominal thickness.

An inflatable core embodying this invention may be advantageously employed in a number of other blow molding processes in addition to those illustrated and described in FIGURES 1 through 7.

For example, in FIGURE 8, the inflatable core 20 may be positioned in axially speed relationship to the extruder orifice (not shown) so that the leading end 35a of the plastic tubing 35 extruded from such orifice will freely surround the expansible core 20. The blow molds 40a and 40b are then closed to surround the tubing 35, and the upper portions of such blow molds effect a clamping and sealing of one end of the tubing 35, while the leading end 35a lies between the inflatable core 20 and the neck or finish-defining surfaces 42 of the mold halves 40a and 40b. The introduction of pressured fluid into the hollow interior 26 of the core element 25 expands the core element and the surrounding tube portions radially outwardly to effect a compression molding of the tubing in the neck portions 42. Concurrently, or subsequent thereto, pressured fluid may be introduced to the entire interior of the bag 25 to expand the remainder of the mold enclosed tubing into conformity with the interior surfaces of the mold.

Utilization of the expansible core 20 in this manner provides substantial advantages in the blow molding of containers or similar objects having a neck portion upon which it is desirable that no flash be produced. While the components of the expansible core 20 are illustrated in the drawings to be of substantial radial dimensions, this is merely for clarity of illustration, and it is to be emphasized that the expansible core 20 in its collapsed position can be of substantially less diameter than the minimum diameter of the neck or finish portions 42 of the mold 40 when closed. This then accommodates utilization of plastic tubing 35 of substantial wall thickness but with an external diameter appreciably less than the minimum mold neck ring diameter. Thus, when the mold sections 40a and 40b are closed on the tubing, no portion of the leading end 35a of the tubing 35 will be pinched between the neck portions 42 of the molds; at the same time, there is adequate plastic material provided in the tubular extrusion 35 to accommodate expansion of the extrusion to a substantially greater diameter than those portions surrounded by the neck ring portions 42. This overcomes a substantial disadvantage of known machines, wherein the tubular plastic extrusion is extruded directly over a rigid neck ring sizing mandrel, since only a very thin-walled tube could be extruded over the mandrel and yet be smaller than the minimum diameter of the neck ring portions of the mold so as to avoid the creation of axial flash. Hence, such prior art processes could not produce large diameter, narrow neck containers without axial flash.

Referring to FIGURE 9, there is schematically illustrated still another method of producing blown plastic articles in accordance with this invention wherein a severed length 35b of heated thermoplastic material is grasped by any suitable holding mechanism, schematically illustrated by the bars 50, and then transferred by such holding bars to a position overlying the expansible core 20. The mold halves 40a and 40b are then closed upon the severed tubing length 35b, and the compression molding of the neck portions of the article and the blow molding of the body of the desired article proceed in the same manner as described in connection with FIGURE 8. Thus, in effect the core is inserted into the previously extruded tube. As above explained, the small size of the unexpanded core makes such insertion possible by relative tube-core movement.

FIGURE 10 illustrates still another method of utilizing this invention, wherein a severed length of heated thermoplastic tubing 35c is provided and the expansible core 20 is inserted in one end of such tubing and then slightly expanded by the introduction of pressured fluid into the hollow interior 26 of the bag 25 to expand the core sufficiently to exert a holding force on the severed tubing length 35c. Expansible core 20, with the severed tubing length 35c attached, is then transferred to a molding station and the tube is thus inserted between the open mold halves 40a and 40b. The portion of the tube in which the expansible core 20 is inserted lies between the neck portions 42 of the mold halves 40a and 40b. The mold halves are then closed, and the compression molding of the neck portions of the desired article and the blowing of the body portions of the desired article proceed in the same manner as heretofore described.

A still further embodiment of this invention is illustrated in FIGURE 11, wherein a length of heated thermoplastic tubing 35e is first engaged between mold halves 40a and 40b by closure of such mold halves thereon which results in the concurrent closing of one end of the tubing 35e by the molding surfaces 43. The expansible core 20 is then inserted within the other open end of the tubing 35e, and the expansible core is then expanded by the introduction of fluid pressure to form the neck portions of the desired article, and the remaining portions of the tubing are blown into conformity with the mold surfaces through the introduction of pressured fluid through the pipe 21. Thus, core-tube relative movement can be accomplished and core insertion effected even after closure of the mold halves.

Referring to FIGURE 12, there is schematically illustrated still another method embodying this invention wherein the hollow plastic article is blown to its desired configuration solely by utilization of the inflatable core or bag 25b. As in the modification in FIGURE 7, the wall thickness of the bag 25b is constructed to vary axially of the length thereof to permit the bag to expand to the desired internal configuration of the hollow plastic article upon inflation by a predetermined pressure. Thus the bag has thin wall sections 47 intermediate heavier wall sections 48. Upon insertion of the bag 25b into a tubular formation 35f of heated thermoplastic material, or the extrusion of the tube 35f about the bag 25b, and the application of a desired internal fluid pressure through the tube 21b, the bag will expand as indicated in FIGURE 11 with relatively greater radial expansion occurring at the thinner wall portions 47. By controlling the maximum internal fluid pressure applied to the bag, it is thus possible to successively produce identical hollow plastic articles without employing any form of external mold. Alternatively, the bag may be constructed of known rubber molding compositions which have the property of expanding only to a predetermined degree, hence control of the fluid pressure applied to the bag will be less critical.

Thus, the present invention provides several advantages over the processes and apparatus and the prior art. The utilization of the expansible core makes possible the formation of portions of the article, such as the finish of a container or the like, with extreme accuracy and without any "flash" or waste material. The deflated core is insertable into tubes of small internal diameter, but appreciable wall thickness, thus further eliminating peripheral flash formation. Additionally, the pressure medium used to expand the elastic core may be a coolant, thus shortening the overall cycle time by cooling the plastic material during blow-molding from the interior as well as from the exterior mold walls. Variations in the wall thickness of the expansible core may be utilized to obtain a desired distribution of plastic material throughout various portions to the article, e.g., to promote wall thickness uniformity or desired wall thickness variations in odd shaped articles, or, even to eliminate an exterior blow mold. Further, by varying the speed of upward movement of the core 25 during extrusion of the tube, the wall thickness of the plastic coating on the core may be varied for the same purposes. Additionally, the core may be utilized to transfer the extruded tube from an extrusion station to a different or remote molding station.

The embodiments of the invention in which an exclusive property or privilege is claimed, are defined as follows.

I claim:

1. The method of making a plastic article comprising the steps of extruding a tube of heated and plasticized plastic material from an annular orifice and about a cylindricl expnsible core, continuing the extrusion of an additional length of tube unsupported by said core, enclosing both the supported and unsupported portions of the tube in a sourrounding blow-mold spaced from the tube, initially expanding only the core to force that portion of the tube supported thereby against the blow-mold, and subsequently expanding the unsupported portions of the tube radially against other portions of the blow-mold cavity.

2. In a method of making a blown plastic article, the steps of extruding an unconfined length of tubing from heated plasticized plastic material while supporting a portion of said tubing only interiorly on a core disposed therein, enclosing said length of tube in a surrounding blow-mold, expanding the core to confine the plastic materials supported thereby between a portion only of the blow-mold and said core, and then expanding the unsupported portions of said tube by fluid under pressure introduced through the core.

3. A method of making a plastic article from heated and plasticized plastic material comprising the steps of extruding a tube through an annular orifice, disposing a core interiorly of the tube, enclosing the tube and the core therein in the cavity of a surrounding blow-mold, and expanding the core and the tube radially into contact with the blow-mold cavity by heat exchange fluid introduced into the core to expand the same, thereby confining the expanded plastic tube intermediate the expanded core and the blow-mold cavity.

4. The method of forming a hollow plastic container which comprises extruding a moldable plastic material from an orifice in tubular form and around a holding element, temporarily attaching a limited length thereof to said element while axially moving said element from said orifice, continuing said extrusion to provide an unconfined length of said tubular form integral with said attached length, said unconfined extrusion and said attached length of said tubular form in combination being of sufficient length to form a container therefrom, enclosing said attached length and said unconfined tubular form in a blow-mold, severing said enclosed tubular form from said orifice and expanding both said attached and unconfined tubular forms to the confines of said mold.

5. The method of forming a hollow plastic article which comprises extruding a tube of moldable plastic material from an orifice around an expansible core, temporarily attaching a portion only of the tube to said core while axially moving said core from said orifice, continuing said extrusion to provide an additional length of tube integral with said length attached to said core, said tube as a whole being of sufficient length to form a complete article therefrom, enclosing both said attached length and said additional length of tube in a blow-mold, severing said enclosed tubular form from said orifice, first expanding said attached length of tube to the confines of the enclosing portion of said mold by expansion of the core to form a portion only of the article, and then expanding said additional length to the confines of said mold to complete the article.

6. The method of making a plastic article from a tube of heated and plasticized plastic material extruded from an annular orifice and subsequently enclosed in a blow-mold, the steps of positioning an expansible core interiorly of a portion only of the tube prior to closure of the blow mold, initially expanding only the core to force the portion of the tube surrounding the core against the blow-mold, and subsequently expanding the remainder of the tube radially against other portions of the blow-mold cavity.

7. In a method of making a blown plastic article the steps of extruding an unconfined length of tubing, from heated plasticized plastic material, a portion only of said tubing being interiorly supported during and after extrusion on a core disposed therein, enclosing said length of tube in a surrounding blow-mold having a cavity defining the complete article, expanding the core only to confine the plastic material supported thereby between a portion of the article between the core and the blow-mold portion, and then expanding the remaining portions of said tube by fluid under pressure introduced through the core, thereby forming the remainder of the article integral with said portion thereof previously formed.

8. A method of making a plastic article from an extruded tube of heated and plasticized plastic material the steps of extruding at least a portion of the tube on an expansible core located interiorly of the tube, enclosing the tube and the core therein in the cavity of a blow-mold and expanding the core radially to bring the tube into contact with the blow-mold cavity, the expansion being effected by heat exchange fluid introduced only into the core to expand the same, thereby confining the expanded plastic tube intermediate the expanded core and the blow-mold cavity.

9. In a method of making a plastic article, the steps of initially extruding a tube of heated and plasticized plastic material from an annular orifice and about a cylindrical expansible core, subsequently extruding an additional length of tube unsupported by said core, closing the sections of a partible blow-mold on both the supported and unsupported portions of the tube to pinch shut the unsupported tube portion exteriorly of the orifice, initially expanding the core to confine the portion of the tube supported thereby between the blow-mold and the expanded core, and then expanding the unsupported and pinched portions of the tube radially against other portions of the blow-mold cavity.

10. The method of forming a hollow plastic container which comprises extruding a tube of moldable plastic material from an orifice about an expansible core coaxial with said orifice, thermally shrinking a portion of the tube onto said core for co-movement therewith, axially moving said core from said orifice, continuing said extrusion to provide an unconfined length of tube integral with those portions on said core, said unconfined tube in combination with the tube portion on said core being of sufficient length to form a container therefrom, enclosing said attached length and said unconfined tubular form a blow-mold having an interior cavity defining a container, the neck-defining portion of the cavity being aligned with the core-supported tube portion, initially expanding said core and the portion of the tube against the neck-defining portion of the mold, and subsequently expanding the remainder of the tube against the rest of the mold to form the finished container.

11. In a method of making a blown plastic container for heated platsicized material, the steps of extruding from said material a relatively short length of tube supported on an expansible core disposed therein, extruding a further and greater length of tube unsupported by said core, enclosing the complete length of tube in a surrounding blow-mold having an interior container-defining mold cavity with upper neck and lower body portions, expanding the core only to confine the relatively short length of tube supported thereby between the upper neck portion only of the blow-mold cavity and said core, and then expanding the unsupported greater length of said tube by fluid pressure introduced through the core directly into the tube to blow the tube further length against the lower body portion of the mold.

12. A method of making a plastic article from heated and plasticized plastic material comprising the steps of continuously extruding a tube through an annular orifice, inserting a core into the tube adjacent the orifice, severing the tube from the orifice, transferring the core and the tube to a remote blowing station to accommodate subsequent extrusion of another tube, enclosing the tube and the core therein in the cavity of a surrounding blow-mold, expanding the core and the tube radially into contact with the blow-mold cavity by heat exchange fluid introduced into the core to expand the same, thereby confining the expanded plastic tube intermediate the expanded core and the blow-mold cavity, and returning the core to the orifice for insertion into a subsequently extruded tube.

13. The method of forming a hollow plastic article which comprises extruding a tube of moldable plastic material from an orifice, temporarily attaching a portion only of the tube to an expansible core, said tube as a whole being of sufficient length to form a complete article therefrom, enclosing substantially the entire length of tube in a blow-mold, first expanding said attached length of tube to the confines of the enclosing portion of said mold by expansion of the core to form a portion only of the article, and then expanding said additional length to the confines of said mold to complete the article.

14. A method of making a plastic article from an extruded tube of heated and plasticized plastic material the steps of extruding at least a portion of the tube on an expansible core located interiorly of the tube, initially only partially expanding the core to secure the tube thereon, enclosing the tube and the core therein in the cavity of a blow-mold and further expanding the core radially to bring the tube into contact with the blow-mold cavity, the expansion being effected by heat exchange fluid introduced only into the core to expand the same, thereby confiining the expanded plastic tube intermediate the expanded core and the blow-mold cavity.

15. In a method of making a plastic article, the steps of initially extruding a tube of heated and plasticized plastic material from an annular orifice, inserting a cylindrical expansible core into one end of the tube, an appreciable length of tube being unsupported by said core, closing the sections of a partible blow-mold on both the supported and unsupported portions of the tube to pinch shut the unsupported tube portion exteriorly of the orifice, and expanding both the core and the unsupported length of tube interiorly of the mold, the core confining the portion of the tube supported thereby between the blow-mold and the expanded core and the unsupported and pinched portions of the tube being expanded freely radially against other portions of the blow-mold cavitv.

16. A method of making a plastic container having a finish portion and a body portion from heated and plasticized plastic material comprising the steps of extruding a tube through an annular orifice, the tube having an exterior diameter less than the exterior diameter of the container finish portion, disposing an expansible core interiorly of at least a portion of the tube, enclosing the tube and the core therein in the cavity of a surrounding blow-mold, the blow-mold cavity having a finish-defining portion and a body-defining portion both spaced from the tube enclosed therein and introducing fluid under pressure into the core and the tube to expand the tube radially into contact with the blow-mold cavity finish and body portions, that portion of the tube surrounding the core contacting the finish portion of the cavity and being confined intermediate the core and the cavity.

17. A method of making a plastic article from heated and plasticized plastic material comprising the steps of continuously extruding a tube through an annular orifice, inserting a core into the tube adjacent the orifice, severing the tube from the orifice, transferring the core and the tube to a remote blowing station to accommodate subsequent extrusion of another tube, enclosing the tube and the core therein in the cavity of a surrounding blow-mold, expanding the core and the tube radially into contact with the blow-mold cavity by fluid under pressure introduced thereinto to expand the same, thereby confining a portion of the expanded plastic tube intermediate the expanded core and the blow-mold cavity, and returning the core to the orifice for insertion into a subsequently extruded tube.

18. A method of making a plastic article from an extruded tube of heated and plasticized plastic material the steps of extruding a portion of the tube on an expansible core located interiorly of the tube, initially only partially expanding the core to secure the tube thereon, enclosing the tube and the core therein in the cavity of a blow-mold, further expanding the core radially to bring the tube into contact with the blow-mold cavity, the expansion being effected by heat exchange fluid introduced only into the core to expand the same, thereby confining the expanded plastic tube portion intermediate the expanded core and the blow-mold cavity, and expanding that portion of the tube not surrounding the core to form the remainder of the article.

19. In a method of making a blown plastic article from heated plasticized material, the steps of extruding from said material an axially elongated tube having peripherally enclosed therein an interior expansible core having axially spaced wall sections of varying wall thickness, radially expanding the core and the tube to form an article, the extent of radial expansion of the core being inversely proportional to the wall thickness of the sections thereof, and chilling the expanded tube to form a plastic article in which the radial dimensions vary proportionately with the extent of expansion of the core.

20. In a method of making a blown plastic article from an elongated, open-ended tube of heated plasticized material, the steps of closing the sections of a particle blow mold on the elongated tube as the tube is supported at its inner periphery and throughout less than its entire length by an interior expansible core, the closure of the mold pinching shut a portion of the tube unsupported by the core to form an expansible tube segment, and subsequently expanding the core and the tube segment interiorly of the mold.

References Cited in the file of this patent

UNITED STATES PATENTS

| | | |
|---|---|---|
| 2,206,410 | Lally | July 2, 1940 |
| 2,410,936 | Gronemeyer et al. | Nov. 12, 1946 |
| 2,898,633 | Burch | Aug. 11, 1959 |

FOREIGN PATENTS

| | | |
|---|---|---|
| 1,030,004 | France | June 9, 1953 |